US010579654B2

(12) United States Patent
Ye et al.

(10) Patent No.: US 10,579,654 B2
(45) Date of Patent: Mar. 3, 2020

(54) METHOD AND DEVICE FOR GENERATING ONLINE QUESTION PATHS FROM EXISTING QUESTION BANKS USING A KNOWLEDGE GRAPH

(71) Applicant: Alibaba Group Holding Limited, Grand Cayman (KY)

(72) Inventors: Zhou Ye, Hangzhou (CN); Yu Wang, Hangzhou (CN); Fan Chen, Hangzhou (CN); Yang Yang, Hangzhou (CN); Qingkai Mao, Hangzhou (CN); Nannan Du, Hangzhou (CN)

(73) Assignee: ALIBABA GROUP HOLDING LIMITED, Grandy Cayman, KY (US)

( * ) Notice: Subject to any disclaimer, the term of this patent is extended or adjusted under 35 U.S.C. 154(b) by 62 days.

(21) Appl. No.: 15/752,939

(22) PCT Filed: Aug. 10, 2016

(86) PCT No.: PCT/CN2016/094324
§ 371 (c)(1),
(2) Date: Feb. 15, 2018

(87) PCT Pub. No.: WO2017/028723
PCT Pub. Date: Feb. 23, 2017

(65) Prior Publication Data
US 2018/0246952 A1    Aug. 30, 2018

(30) Foreign Application Priority Data
Aug. 19, 2015    (CN) .......................... 2015 1 0509563

(51) Int. Cl.
*G06F 16/332*    (2019.01)
*G06F 17/27*    (2006.01)
(Continued)

(52) U.S. Cl.
CPC ...... *G06F 16/3329* (2019.01); *G06F 17/2705* (2013.01); *G06F 17/279* (2013.01);
(Continued)

(58) Field of Classification Search
CPC ... G09B 7/00; G09B 7/04; G09B 7/02; G09B 5/08; G09B 7/06; G09B 7/07; G09B 7/08;
(Continued)

(56) References Cited

U.S. PATENT DOCUMENTS 8,442,984 B1    5/2013    Pennock et al.
9,213,771 B2   12/2015    Chen et al.
(Continued)

FOREIGN PATENT DOCUMENTS

CN    102663910 A    9/2012
CN    103150938 A    6/2013
(Continued)

OTHER PUBLICATIONS

International Search Report to corresponding International Application No. PCT/CN2016/094324 dated Nov. 2, 2016 (2 pages).

Primary Examiner — Yogeshkumar Patel
(74) Attorney, Agent, or Firm — James J. DeCarlo; Greenberg Traurig, LLP (57) ABSTRACT

The disclosure provides an information processing method and device. In one embodiment, an information processing method comprises receiving a request for generating questions inputted by a user, the request for generating questions includes a to-be-learned knowledge point; acquiring, from a knowledge graph for questions, a node path including a target node indicating the to-be-learned knowledge point, the nodes in the knowledge graph for questions indicating question-answering steps of existing questions, knowledge points tested in the question-answering steps, and question-
(Continued)

ing styles corresponding to the question-answering steps; and generating questions required by the user according to question-answering steps, knowledge points tested in the question-answering steps, and questioning styles corresponding to the question-answering steps indicated by nodes on the node path. The present disclosure enables generation of new questions and facilitates the expansion of a question bank.

20 Claims, 6 Drawing Sheets

(51) Int. Cl.
*G06N 5/02* (2006.01)
*G06N 5/04* (2006.01)
*G06N 7/02* (2006.01)

(52) U.S. Cl.
CPC ............... *G06N 5/02* (2013.01); *G06N 5/022* (2013.01); *G06N 5/048* (2013.01); *G06N 7/02* (2013.01); *G06N 5/042* (2013.01)

(58) Field of Classification Search
CPC ... G09B 7/077; G06F 16/3329; G06F 17/279; G06F 16/24; G06F 16/338; G06F 16/9535; G06F 16/958; G06F 16/337; G06F 16/00; G06F 16/90335; G06F 16/951; G06F 16/2365; G06F 17/2705; G06F 17/2785; G06F 17/2881; G06N 5/02; G06N 7/02; G06N 7/005
See application file for complete search history.

(56) References Cited

U.S. PATENT DOCUMENTS

| | | | |
|---|---|---|---|
| 9,223,775 | B2 | 12/2015 | Wang et al. |
| 9,336,527 | B2 | 5/2016 | Chang et al. |
| 9,471,668 | B1 | 10/2016 | Alupului et al. |
| 9,633,309 | B2 | 4/2017 | Giffels et al. |
| 9,830,556 | B2 | 11/2017 | Maarek et al. |
| 9,875,296 | B2 | 1/2018 | Lu et al. |
| 2009/0164566 | A1 | 6/2009 | Kawai et al. |
| 2010/0241488 | A1 | 9/2010 | Jacobson |
| 2011/0125734 | A1 | 5/2011 | Duboue et al. |
| 2013/0252221 | A1 | 9/2013 | McNutt et al. |
| 2014/0220540 | A1* | 8/2014 | Burgin .................... G09B 7/07 434/362 |
| 2015/0004588 | A1* | 1/2015 | Vats ......................... G09B 7/02 434/350 |
| 2015/0006156 | A1 | 1/2015 | Wang et al. |
| 2015/0235160 | A1 | 8/2015 | Larlus-Larrondo et al. |
| 2016/0232221 | A1 | 8/2016 | McCloskey et al. |
| 2016/0283491 | A1 | 9/2016 | Lu et al. |
| 2017/0213124 | A1 | 7/2017 | Alupului et al. |
| 2017/0242915 | A1 | 8/2017 | Kentaro et al. |

FOREIGN PATENT DOCUMENTS

| | | |
|---|---|---|
| CN | 103473224 A | 12/2013 |
| CN | 103870463 A | 6/2014 |
| CN | 104462228 A | 3/2015 |

\* cited by examiner

METHOD AND DEVICE FOR GENERATING ONLINE QUESTION PATHS FROM EXISTING QUESTION BANKS USING A KNOWLEDGE GRAPH

CROSS-REFERENCE TO RELATED APPLICATIONS

The present disclosure claims priority to Chinese Patent Application No. 201510509563.8, filed on Aug. 19, 2015 entitled "INFORMATION PROCESSING METHOD AND DEVICE" and PCT Appl. No. PCT/CN16/94324 filed on Aug. 10, 2016 and entitled "INFORMATION PROCESSING METHOD AND DEVICE," both incorporated herein by reference in their entirety.

BACKGROUND

Technical Field

The disclosed embodiments relate to the field of Internet technologies, and in particular, to an electronic question bank processing method and device.

Description of the Related Art

With the development of Internet technologies, a number of websites focusing on providing questions for students have emerged. Examples of such sites include the "Students exercise network", "Yuantiku", and "51zuoti". The existence of websites like these relies heavily on the questions in their question banks. Currently, three main technologies regarding such questions exist: first, classification and presentation of questions; second, searching and recommendation of questions; and third, correction and feedback of questions. All of these technologies are related to processing of existing questions in the question banks and none of the technologies address the generation of new questions. However, the question banks need to be continuously enhanced. Thus a method that can generate new questions is needed to expand question banks.

SUMMARY

Many aspects of the disclosed embodiments provide an information processing method and device, used for generating new questions to enhance the collection of a question bank.

One aspect of the disclosed embodiments provides an information processing method, comprising: receiving a request for generating questions inputted by a user, the request for generating questions comprising a to-be-learned knowledge point; acquiring, from a knowledge graph for questions, a node path comprising a target node indicating the to-be-learned knowledge point, the nodes in the knowledge graph for questions indicating question-answering steps of existing questions, knowledge points tested in the question-answering steps, and questioning styles corresponding to the question-answering steps; and generating questions required by the user according to question-answering steps, knowledge points tested in the question-answering steps, and questioning styles corresponding to the question-answering steps indicated by nodes on the node path.

Another aspect of the disclosed embodiments provides an information processing method, comprising: parsing question-answering steps of existing questions into nodes, the nodes indicating the question-answering steps, knowledge points tested in the question-answering steps, and questioning styles corresponding to the question-answering steps; and marking connection relationships between the nodes to generate a knowledge graph for questions.

Still another aspect of the disclosed embodiments provides an information processing device, comprising: a receiving module, configured to receive a request for generating questions inputted by a user, the request for generating questions comprising a to-be-learned knowledge point; an acquisition module, configured to acquire, from a knowledge graph for questions, a node path comprising a target node indicating the to-be-learned knowledge point, the nodes in the knowledge graph for questions indicating question-answering steps of existing questions, knowledge points tested in the question-answering steps, and questioning styles corresponding to the question-answering steps; and a generation module, configured to generate questions required by the user according to question-answering steps, knowledge points tested in the question-answering steps, and questioning styles corresponding to the question-answering steps indicated by nodes on the node path.

Still yet another aspect of the disclosed embodiments provides an information processing device, comprising: a parsing module, configured to parse question-answering steps of existing questions into nodes, the nodes indicating the question-answering steps, knowledge points tested in the question-answering steps, and questioning styles corresponding to the question-answering steps; and a marking module, configured to mark connection relationships between the nodes to generate a knowledge graph for questions.

In the disclosed embodiments, question-answering steps of existing questions are parsed into nodes in advance, the nodes indicating the question-answering steps, knowledge points tested in the question-answering steps, and questioning styles corresponding to the question-answering steps; and then a knowledge graph for questions is formed according to connection relationships between the nodes; when a request for generating questions inputted by a user is received, a node path comprising a target node indicating a to-be-learned knowledge point comprised in the request for generating questions is acquired from the knowledge graph for questions according to the to-be-learned knowledge point; and then questions required by the user are formed according to question-answering steps, knowledge points tested in the question-answering steps, and questioning styles corresponding to the question-answering steps indicated by nodes on the node path. The disclosed embodiments solve the problem of question generation and further facilitate the expansion and enhancing of the collection of a question bank.

BRIEF DESCRIPTION OF THE DRAWINGS

In order to illustrate the technical solutions in the disclosed embodiments more clearly, the drawings which need to be used in the description of the embodiments or the prior art will be introduced briefly in what follows. It is apparent that the drawings described below are merely some embodiments, and those of ordinary skill in the art can also obtain other drawings according to these drawings without making creative efforts.

DETAILED DESCRIPTION

In order to make the purposes, technical solutions, and advantages of the disclosed embodiments clearer, the technical solutions in the embodiments of the present disclosure will be clearly and fully described below with reference to the drawings in the disclosed embodiments. Apparently, the described embodiments are part of the embodiments of the disclosure, rather than all the embodiments. On the basis of the embodiments of the disclosure, all other embodiments obtained by those of ordinary skill in the art without making creative efforts fall within the protection scope of the disclosure.

In view of the problem of question generation faced by the prior art, the disclosed embodiments provide a solution with the specific principle of: generating a knowledge graph for questions based on problem solving processes of massive existing questions, the nodes in the knowledge graph for questions indicating question-answering steps of the existing questions, knowledge points tested in the question-answering steps, and questioning styles corresponding to the question-answering steps; when a user inputs a request for generating questions, acquiring, from the knowledge graph for questions, a node path satisfying the request for generating questions, and generating questions required by the user according to question-answering steps, knowledge points tested in the question-answering steps, and questioning styles corresponding to the question-answering steps indicated by nodes on the node path. In line of the above, the problem of question generation is solved based on the knowledge graph for questions; questions meeting the user's needs can be rapidly and conveniently generated; and expansion and enhancing of the collection of a question bank are facilitated.

The following embodiments will illustrate the process of generating a knowledge graph for questions and the process of generating questions based on the knowledge graph for questions respectively. Since the question generation process needs to be based on a knowledge graph for questions, the following embodiment will first illustrate the process of generating a knowledge graph for questions.

Figure 1:
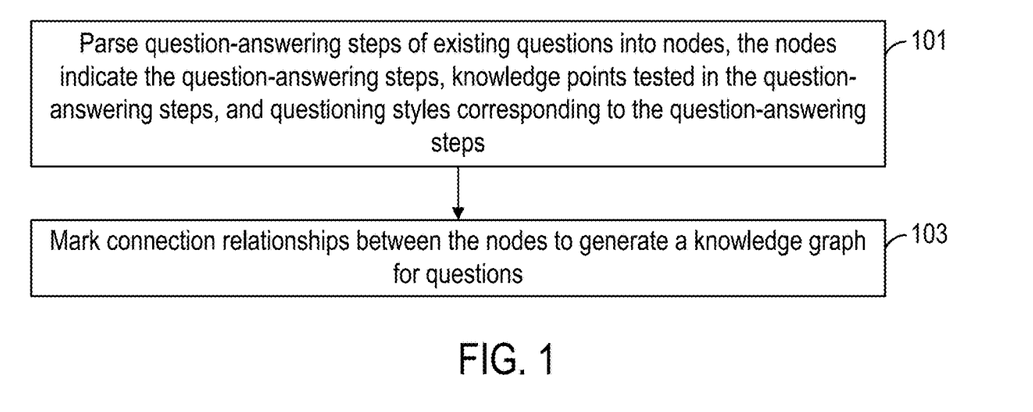
FIG. 1 is a flow diagram of an information processing method according to some embodiments of the disclosure.

FIG. 1 is a flow diagram of an information processing method according to some embodiments of the disclosure. As shown in FIG. 1, the method includes the following steps.

Step 101: Parse question-answering steps of existing questions into nodes, the nodes indicating the question-answering steps, knowledge points tested in the question-answering steps, and questioning styles corresponding to the question-answering steps.

Step 103: Mark connection relationships between the nodes to generate a knowledge graph for questions.

The existing questions refer to questions already existing in the current systems, such as questions existing in a question bank. The greater the number of the existing questions the more information the generated knowledge graph for questions has, and the more contributions the knowledge graph makes to the subsequent question generation process.

In this embodiment, each question of the existing questions is subjected to the same processing, which is specifically: parsing question-answering steps of existing questions into nodes, the nodes indicating the question-answering steps, knowledge points tested in the question-answering steps, and questioning styles corresponding to the question-answering steps. One question generally has multiple question-answering steps, wherein each question-answering step is parsed into one node.

Each question-answering step is generally formed with an input, an output, and a process. A question has its purpose or target, i.e., has its to-be-tested knowledge points, and these knowledge points are generally embodied in question-answering steps. That is, a question-answering step generally has a to-be-tested knowledge point. Additionally, a question-answering step also corresponds to one questioning style. The questioning style refers to how a question is presented for the question-answering step. That is, how a question is presented decides its question-answering step. In the field of questions, there are certain requirements for difficulty levels of questions in addition to testing of knowledge points and the difficulty levels of the questions may also be embodied in question-answering steps. That is, a question-answering step generally also has an answering difficulty in addition to a to-be-tested knowledge point and a corresponding questioning style.

It should be noted that all the information such as the input, output, process, tested knowledge point, corresponding questioning style, and difficulty level of the question-answering step may be known or may be statistically obtained in advance.

For example, assuming a question is specifically the following: given a function $f(x)=\sin(x)\cos(x)-\sqrt{3}\cos(x+\pi)\cos(x)$, where $x\in R$, and R represents a real number, find the smallest positive period of $f(x)$. Question-answering steps of this question and knowledge points tested in the question-answering steps, corresponding questioning styles, or difficulty coefficients are as follows:

Question-Answering Step 1: $\cos(x+\pi)=-\cos(x)$ (testing the quadratic function cosine with an accuracy of 0.95);

Question-Answering Step 2: $\sin(x)\cos(x)=\frac{1}{2}\sin(2x)$, $\cos(x)\cos(x)=\frac{1}{2}\cos(2x)+\frac{1}{2}$ (testing cos double angle formula with an accuracy of 0.85);

Question-Answering Step 3: $\cos(x)\cos(x)=\frac{1}{2}\cos(2x)+\frac{1}{2}$ (testing cos double angle formula with an accuracy of 0.85);

Question-Answering Step 4:

$$f(x) = \sin\left(2x + \frac{\pi}{2}\right) + \frac{\sqrt{3}}{2}$$

(testing computation of a trigonometric function with an accuracy of 0.95);

Question-Answering Step 5: minimum positive period $$T = \frac{2\pi}{2} = \pi$$

(testing the concept of the smallest positive period with an accuracy of 0.90).

In the aforementioned question-answering steps, the parts on the left of the equal signs are inputs of the question-answering steps. The parts on the right of the equal signs are outputs of the question-answering steps. The entire equations represent processes of the question-answering steps. The contents in the parentheses are knowledge points tested in the question-answering steps. Finally, the accuracies in the parentheses represent difficulty levels of the question-answering steps. For example, in the aforementioned question-answering step 1, $\cos(x+\pi)$ is the input of the question-answering step 1; $-\cos(x)$ is the output of the question-answering step 1; the equation $\cos(x+\pi)=-\cos(x)$ is the process of the question-answering step 1; the accuracy of 0.95 is the difficulty level of the question-answering step 1; and the quadratic function cosine is the knowledge point tested in the question-answering step 1.

In this embodiment, the accuracy is used to represent the difficulty level of a question-answering step, but other indicators may also be used without being limited to this. Generally, if the accuracy represents the ratio between the number of users successfully completing the step and the total number of users participating in completing the step, a higher accuracy indicates a lower difficulty level of the question-answering step. Also, for the same question-answering step, different questioning styles result in different difficulty levels of the question-answering step. A vague questioning style generally increases the difficulty level of the question-answering step. For example, the questioning style of solving $\cos(x+\pi)$ in the question-answering step 1 is quite clear; and the problem may also be expressed as "a cosine of angle x after rotation by 180 degrees anticlockwise", which has increased its difficulty.

Based on the above analysis, in an implementation of parsing question-answering steps of existing questions into nodes, inputs of the question-answering steps, outputs of the question-answering steps, processes of the question-answering steps, knowledge points tested in the question-answering steps, and questioning styles corresponding to the question-answering steps may be parsed into input attributes, output attributes, process attributes, knowledge point attributes, and questioning style attributes of the nodes respectively.

Further, if a question-answering step further includes difficulty level information, difficulty levels of the question-answering steps further need to be parsed into difficulty attributes of the nodes.

In view of the above, the nodes in the knowledge graph for questions include attributes such as inputs, processes, outputs, questioning styles, difficulty levels, and knowledge points. Using the aforementioned question-answering step 1 as an example, a node corresponding to the question-answering step includes the following contents:

Input: $\cos(x+\pi)$
Process: $\cos(x+\pi)=-\cos(x)$
Output: $-\cos(x)$
Questioning Style: solve $\cos(x+\pi)$
Difficulty Level: 0.95
Knowledge Point: the quadratic function cosine After the question-answering steps of all the questions are parsed into nodes, connection relationships between the nodes can be marked to generate the knowledge graph for questions. The marking connection relationships between the nodes actually refer to connecting connectable nodes to form a knowledge graph structure.

For example, a manner of marking the connection relationships between the nodes is: for any two nodes, determine whether an output of a question-answering step indicated by a first node of the two nodes equals to an input of a question-answering step indicated by a second node of the two nodes; if a determination result is positive, it is marked that the first node and the second node are connected. If the determination result is negative, it is marked that the first node and the second node are not connected. The knowledge graph for questions can be generated after the connection relationships between all the nodes are marked. For example, in data expression, whether two nodes are connected may be represented in the following manner: node number: x, node number: y, connected or not connected: 1 or 0. If the value of the "connected" or "not connected" field is 1, it means that node x and node y are connected; and if the value of the "connected" or "not connected" field is 0, it means that node x and node y are not connected.

It should be noted that question-answering steps for the same question already have clear connection relationships. That is, connection relationships between nodes parsed from the question-answering steps are already clear and thus they may not be marked by using the aforementioned process. That is to say, the aforementioned process of marking connection relationships between nodes is mainly used in marking connection relationships between nodes parsed from question-answering steps of different questions.

In an alternative embodiment, different questions may have the same question-answering steps due to the large number of questions. The question-answering steps may be repeated, which means that nodes in the knowledge graph for questions have repetitions. In order to simplify the knowledge graph for questions, before the knowledge graph for questions is generated, parsed nodes may be merged to merge nodes indicating the same question-answering steps into one node, so as to shrink the knowledge graph for questions.

Figure 2:
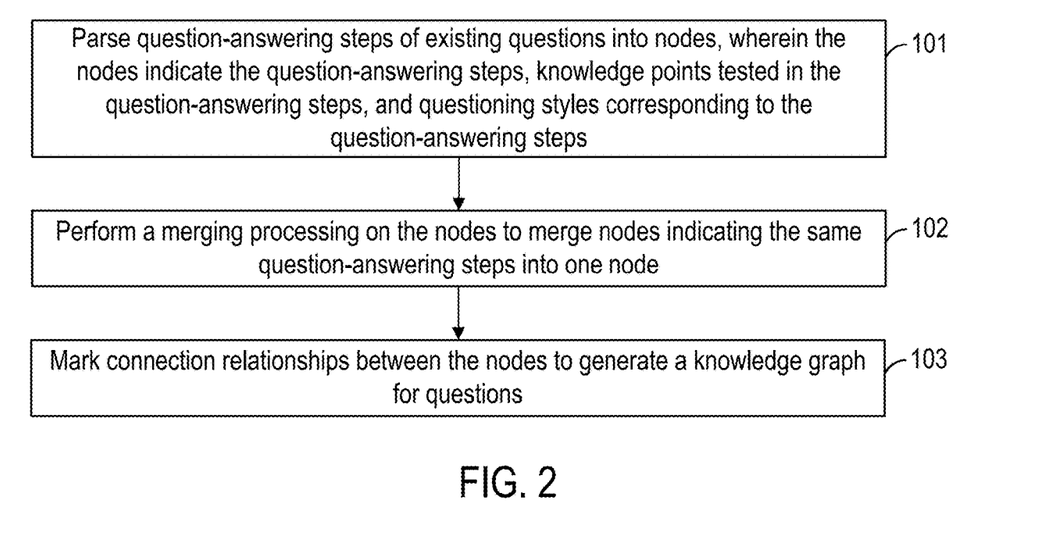
FIG. 2 is a flow diagram of an information processing method according to some embodiments of the disclosure.

In the embodiment shown in FIG. 2, before marking connection relationships between the nodes, i.e., before step 103 in FIG. 1, the method further includes the following step.

Step 102: Perform a merging process on the nodes to merge nodes indicating the same question-answering steps into one node.

Through the inputs, outputs, and processes of the question-answering steps, one knows whether question-answering steps are the same; and if inputs, outputs, and processes of two question-answering steps are essentially the same, the two question-answering steps are considered the same. For example, $\cos(x+\pi)$, $\cos(x+2\pi)$, and $\cos(x+3\pi)$ are all to test the quadratic function cosine. These inputs can be considered essentially the same, with the only difference in quadrant values.

Based on the above analysis, a fuzzy rule may be preset, wherein the fuzzy rule is used for extracting essential concepts of inputs, processes, and outputs of question-answering steps, and the remaining information will be fuzzed. Then, a manner of performing a merging process on the nodes is: fuzzy-processing the question-answering steps indicated by the nodes according to a fuzzy rule, so as to obtain fuzzy question-answering steps; and merging nodes indicating the same fuzzy question-answering step into one node, wherein the merged node indicates the same fuzzy question-answering step.

The same question-answering steps would generally have the same knowledge points. The knowledge points tested in the fuzzy question-answering step indicated by the merged node are the knowledge points tested in question-answering steps indicated by the nodes before merging. Further, a questioning style corresponding to the fuzzy question-answering step indicated by the merged node may be obtained by clustering questioning styles corresponding to the question-answering steps indicated by the nodes before merging. Similarly, a difficulty level of the fuzzy question-answering step indicated by the merged node may be obtained by clustering difficulty levels of the question-answering steps indicated by the nodes before merging.

For example, still using the aforementioned question-answering step 1 as an example, a merged node indicates a fuzzy question-answering step, a knowledge point tested, a questioning style, and a difficulty level in the following format:

Input: $\cos(x+?\pi)$
Process: $\cos(x+?\pi)=? \cos(x)+?$
Output: $? \cos(x)$
Questioning Style: (1) solve $\cos(x+?\pi)$ (2) a cosine of angle x after rotation by ? degrees ? clockwise
Difficulty: (1) 0.95 (2) 0.9
Knowledge Point: the quadratic function cosine The aforementioned questioning style and difficulty level may be obtained by clustering questioning styles and difficulty levels indicated by nodes before merging.

In this embodiment, nodes are merged so that the number of nodes can be reduced and a knowledge graph for questions generated based on the merged nodes would be relatively simple.

The obtaining of the knowledge graph for questions means getting ready for generation of new questions. The following embodiment describes in detail the flow of generating questions based on a knowledge graph for questions.

Figure 3:
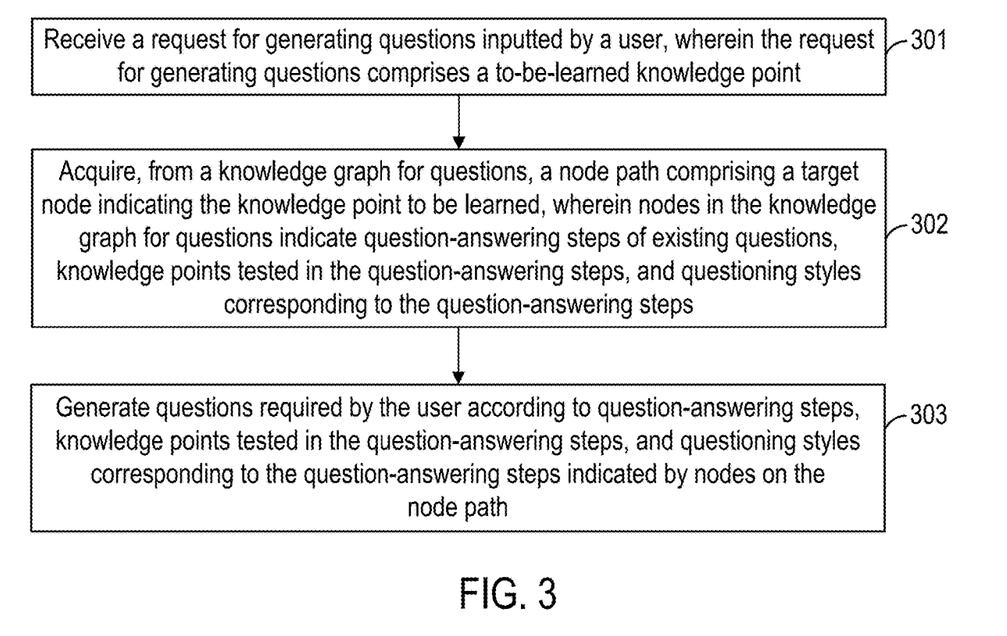
FIG. 3 is a flow diagram of an information processing method according to some embodiments of the disclosure.

FIG. 3 is a flow diagram of an information processing method according to some embodiments of the disclosure. As shown in FIG. 3, the method includes the following steps.

Step 301: Receive a request for generating questions inputted by a user, wherein the request for generating questions comprises a to-be-learned knowledge point.

Step 302: Acquire, from a knowledge graph for questions, a node path comprising a target node indicating the to-be-learned knowledge point, wherein nodes in the knowledge graph for questions indicate question-answering steps of existing questions, knowledge points tested in the question-answering steps, and questioning styles corresponding to the question-answering steps.

Step 303: Generate questions required by the user according to question-answering steps, knowledge points tested in the question-answering steps, and questioning styles corresponding to the question-answering steps indicated by nodes on the node path.

The illustrated embodiment is used for generating new questions, which is specifically implemented based on a pre-generated knowledge graph for questions.

When a user needs to generate new questions, the user may input a request for generating questions, wherein the request for generating questions normally includes a knowledge point the user wants to learn or practice which is briefly referred to as a to-be-learned knowledge point. An information processing device receives the request for generating questions inputted by the user. For example, the information processing device may provide an interactive interface for the user to input the request for generating questions. The information processing device then receives the request for generating questions inputted by the user through the interactive interface.

After receiving the request for generating questions inputted by the user, the information processing device analyzes the to-be-learned knowledge point from the request for generating questions; determines a node indicating the to-be-learned knowledge point from the knowledge graph for questions according to the to-be-learned knowledge point. For ease of description, the node indicating the to-be-learned knowledge point is referred to as a target node; and then the information processing device acquires a node path including the target node, wherein the node path consists of multiple nodes. Since each node in the knowledge graph for questions indicates a question-answering step of an existing question, a knowledge point tested in the question-answering step, and a questioning style corresponding to the question-answering step respectively, the nodes on the node path also indicate question-answering steps, knowledge points tested in the question-answering steps, and questioning styles corresponding to the question-answering steps respectively. Thus the questions required by the user can be generated according to the question-answering steps, the knowledge points tested in the question-answering steps, and the questioning styles corresponding to the question-answering steps indicated by the nodes on the node path.

It should be noted that the manner of the nodes in the knowledge graph for questions indicating the question-answering steps, the knowledge points tested in the question-answering steps, and the questioning styles corresponding to the question-answering steps is that: input attributes, output attributes, process attributes, knowledge point attributes, and questioning style attributes of the nodes correspond to inputs of the question-answering steps, outputs of the question-answering steps, processes of the question-answering steps, the knowledge points tested in the question-answering steps, and the questioning styles corresponding to the question-answering steps respectively. Further, if a question-answering step further includes difficulty level information, difficulty attributes of the nodes may correspond to difficulty levels of the question-answering steps.

In an alternative embodiment, the aforementioned step 302, i.e., acquiring, from a knowledge graph for questions, a node path comprising a target node indicating the to-be-learned knowledge point comprises: determining a location of the target node in the knowledge graph for questions according to the to-be-learned knowledge point; determine a starting node and an ending node according to the location of the target node in the knowledge graph for questions and a specified path length range; and acquiring the node path passing through the target node from the starting node to the ending node.

In this implementation, a path length range is preset; and the number of nodes on the node path is restricted, so as to avoid acquiring a node path including too many nodes, which helps to control the question complexity.

For example, a unique path length range may be preset. In actual use, a specific path length can be selected from the path length range. Or, mapping relationships between knowledge points and path lengths in the path length range may be preset. For example, for some knowledge points having high difficulty levels, a large path length may be set to meet the needs of testing the knowledge points. For another example, for some knowledge points having low difficulty levels, a large path length may be set to increase the question difficulty. Based on this, matching may be performed in the aforementioned mapping relationships for the to-be-learned knowledge point in the request for generating questions, so as to obtain a path length matching the to-be-learned knowledge point.

Further, the nodes in the knowledge graph for questions are clustered in advance according to the knowledge points tested in the question-answering steps indicated by the nodes in the knowledge graph for questions, so as to determine knowledge point categories to which the nodes belong. This is equivalent to classifying the nodes in the knowledge graph for questions according to knowledge point categories. Based on this, in determining a location of the target node in the knowledge graph for questions according to the to-be-learned knowledge point, a knowledge point category to which the to-be-learned knowledge point belongs may be acquired; and then nodes in the knowledge graph for questions belonging to the knowledge point category to which the to-be-learned knowledge point belongs are acquired; and the target node and the location of the target node in the knowledge graph for questions are determined from the nodes belonging to the knowledge point category. The target node and the location of the target node in the knowledge graph for questions can be quickly found through the knowledge point category, which helps to enhance the efficiency of question generation.

For example, one implementation of the determining a starting node and an ending node according to the location of the target node in the knowledge graph for questions and a specified path length range is as follows: selecting a to-be-used path length from the specified path length range; determining the target node in the knowledge graph for questions according to the location of the target node in the knowledge graph for questions; acquiring a node connected to the target node and having a path length to the target node smaller than the to-be-used path length as the starting node according to the connection relationships of the target node; and acquiring a node connected to the starting node through the target node and having a path length to the starting node equal to the to-be-used path length as the ending node according to the connection relationships of the starting node.

As another example, the location of the target node in the knowledge graph for questions and the specified path length range may be used as traversal conditions; a node path passing through the target node and having a path length satisfying the path length range can be directly found using various traversal algorithms; and one endpoint of the node path is determined as the starting node and one endpoint is determined as the ending node according to an input/output direction of the nodes on the node path.

It should be additionally noted that the path length from the starting node to the target node and the path length from the target node to the ending node are not limited in this embodiment; as long as a sum of the two path lengths satisfies the specified path length range that will suffice. Certainly, two node paths having the same or approximately the same path lengths may also be selected using a certain algorithm. For example, in the aforementioned selection of the starting node, any node connected to the target node and having a path length to the target node equal to half of the to-be-used path length may be selected as the starting node.

Multiple pairs of starting nodes and ending nodes may be determined through the above mechanism. That is, multiple node paths will be obtained in the end. When multiple node paths passing through the target node and having path lengths satisfying the specified path length range exist, the simplest implementation is to randomly select one or more node paths from them. Such an implementation is relatively simple that helps to improve computational efficiency and reduces computational costs. Certainly, the multiple node paths may also be ranked according to a certain standard; and then one or more optimal node paths are selected therefrom. Or, each node path in the acquired multiple node paths may be used to generate a question for the user directly.

In an alternative embodiment, the aforementioned step 303, i.e., generating questions required by the user according to question-answering steps, knowledge points tested in the question-answering steps, and questioning styles corresponding to the question-answering steps indicated by nodes on the node path includes: combining the questioning styles corresponding to the question-answering steps indicated by each node on the node path to obtain at least one questioning style combination; and combining the question-answering steps indicated by the nodes on the node path and the knowledge points tested in the question-answering steps according to every questioning style combination in the at least one questioning style combination, so as to generate the questions required by the user.

If the question-answering steps indicated by the nodes on the node path all correspond to one questioning style, one questioning style combination can be obtained; if the question-answering steps indicated by the nodes on the node path correspond to multiple questioning styles, multiple questioning style combinations can be obtained.

Different questions may be generated with different questioning style combinations. The combining the question-answering steps and the knowledge points tested in the question-answering steps indicated by the nodes on the node path according to each questioning style combination, so as to generate the questions required by the user is specifically: according to the questioning style combination, combining the question-answering steps and the knowledge points tested in the question-answering steps indicated by the nodes to form a piece of description content that describes a question.

Further, the question-answering steps indicated by the nodes on the node path are fuzzy-processed. Then, the process of combining the question-answering steps indicated by the nodes on the node path and the knowledge points tested in the question-answering steps according to every questioning style combination in the at least one questioning style combination, so as to generate the questions required by the user includes: combining the question-answering steps indicated by the nodes on the node path and the knowledge points tested in the question-answering steps according to every questioning style combination, so as to generate questions to be completed; and concretizing question-answering steps in the questions to be completed according to a preset concretization rule, so as to generate the questions required by the user.

The concretization rule, corresponding to the fuzzy rule in the aforementioned embodiment, is an inverse rule of the fuzzy rule, and is used for concretizing the contents fuzzed with the fuzzy rule; for example, the concretization rule is to complete the contents represented by "?" in the aforementioned example.

Further, in an alternative embodiment, the request for generating questions inputted by the user not only includes the to-be-learned knowledge point, but also the question difficulty level. Accordingly, the nodes in the knowledge graph for questions further indicate difficulty levels of the question-answering steps.

Based on the above, step 303, i.e., generating questions required by the user according to question-answering steps, knowledge points tested in the question-answering steps, and questioning styles corresponding to the question-answering steps indicated by nodes on the node path, includes: generating exercise candidates according to question-answering steps, knowledge points tested in the question-answering steps, and questioning styles corresponding to the question-answering steps indicated by nodes on the node path; determining difficulty levels of the question candidates according to the difficulty levels of the question-answering steps indicated by the nodes on the node path; and selecting, from the question candidates, the questions required by the user according to the question difficulty level and the difficulty levels of the question candidates.

The difficulty levels of the question candidates may be an accumulation of the difficulty levels of the question-answering steps indicated by the nodes on the node path; or an accumulation of difficulty levels of question-answering steps forming the question candidates. For example, assuming accuracy is used as a difficulty level of a question-answering step; and then the difficulty levels of the question candidates are products of accuracies of the question-answering steps indicated by all the nodes on the node path. After the difficulty levels of the question candidates are obtained, question candidates having difficulty levels conforming to the question difficulty level required by the user may be selected as the questions required by the user according to the question difficulty level required by the user; and these questions are outputted for the user.

It should be noted herein that the specific implementation of the aforementioned step 303 involves three aspects, including questioning style combination, concretization processing, and learning difficulty; and these three aspects may be implemented alone or implemented in any combination.

In order to better explain the method provided in this embodiment, an example is provided below:

Assuming a question bank has the following three questions:
1) Given a function $f(x)=\sin(x)\cos(x)-\sqrt{3}\cos(x+\pi)\cos(x)$, where $x\in R$, find the smallest positive period of $f(x)$.
2) If a graph of a function $y=g(x)$ is obtained after a graph of a function $y=f(x)=\sin(x)\cos(x)$ is translated according to $$\left(\frac{\pi}{4}, \frac{1}{2}\right),$$

fine an expression of g(x).
3) Find the maximum value and the minimum value of a function $\cos(x)(\sin(x)-\cos(x))$.

Information such as question-answering steps, knowledge points tested, questioning styles, and difficulty levels of the three questions is omitted here. Reference may be made to the corresponding examples in the preceding embodiment for the implementation of such information.

The following two new questions may be obtained after the method provided in this embodiment processes the above three questions:
1) Find the maximum value of a function $\cos(x+3\pi)\cos(x)$ after translation according to $$\left(\frac{\pi}{4}, \frac{3\pi}{4}\right),$$

(with a difficulty level of 0.85);
2) Given a function $f(x)=g(x)+c$, where g(x) is a function obtained after a graph of $\sin(x)\cos(2x)$ is translated according to $$\left(\frac{\pi}{4}, \frac{1}{2}\right),$$

and c is the smallest positive period of $\cos(x+5\pi)\cos(3x)$, find the minimum value of $f(x)$ (with a difficulty level of 0.95).

In view of the above, in this embodiment, based on a pre-generated knowledge graph for questions, a node path including a target node indicating a to-be-learned knowledge point may be acquired from the knowledge graph for questions according to the to-be-learned knowledge point comprised in the request for generating questions inputted by a user; and then questions required by the user are formed according to question-answering steps, knowledge points tested in the question-answering steps, and questioning styles corresponding to the question-answering steps indicated by nodes on the node path. The disclosed embodiments solve the problem of question generation and further facilitate the expansion and enhancing of the collection of a question bank.

It should be noted that in order to briefly describe each foregoing method embodiment, all the method embodiments are expressed as a combination of a series of actions; but those skilled in the art should know that the disclosed embodiments are not limited by the sequence of the described actions; certain steps can be applied with different sequences or can be carried out at the same time according to the disclosed embodiments. Secondly, those skilled in the art should also know that all the embodiments described in the description belong to preferred embodiments; the related actions and modules are not necessarily needed for the disclosed embodiments.

In the embodiments, the description of each embodiment has its own focus; and references for those that are not described in detail in a certain embodiment can be made by referring to the related descriptions of other embodiments.

Figure 4:
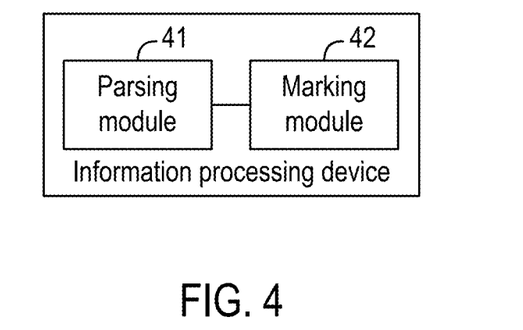
FIG. 4 is a block diagram of an information processing device according to some embodiments of the disclosure.

FIG. 4 is a block diagram of an information processing device according to some embodiments of the disclosure. As shown in FIG. 4, the device includes: a parsing module 41 and a marking module 42.

The parsing module 41 is configured to parse question-answering steps of existing questions into nodes, the nodes indicating the question-answering steps, knowledge points tested in the question-answering steps, and questioning styles corresponding to the question-answering steps.

The marking module 42 is configured to mark connection relationships between the nodes to generate a knowledge graph for questions.

Figure 5:
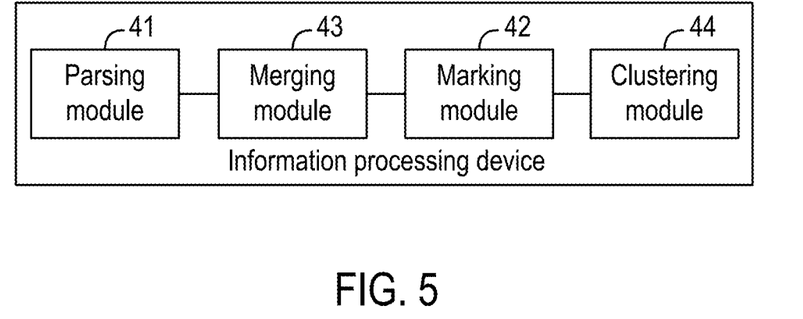
FIG. 5 is a block diagram of an information processing device according to some embodiments of the disclosure.

In an alternative embodiment, as shown in FIG. 5, the information processing device further includes: a merging module 43.

The merging module 43 is configured to perform a merging process on the nodes parsed by the parsing module 41, so as to merge nodes indicating the same question-answering steps into one node before the marking module 42 marks the connection relationships between the nodes.

Further, the merging module 43 may be configured to: fuzzy-process the question-answering steps indicated by the nodes according to a fuzzy rule, so as to obtain fuzzy question-answering steps; and merge nodes indicating the same fuzzy question-answering steps into one node, wherein the merged node indicates the same fuzzy question-answering steps.

The nodes are merged by the merging module 43, which helps to reduce the number of the nodes, simplifying the structure of the generated knowledge graph for questions, and improving the efficiency of generating questions based on the knowledge graph for questions.

In an alternative embodiment, the marking module 42 may be configured to: for any two nodes, determine whether an output of a question-answering step indicated by a first node of the two nodes equals to an input of a question-answering step indicated by a second node of the two nodes. If a determination result is positive, mark that the first node and the second node are connected; and if the determination result is negative, mark that the first node and the second node are not connected.

The knowledge graph for questions can be generated after the connection relationships between all the nodes are marked.

In an alternative embodiment, the parsing module 41 may be configured to: parse inputs of the question-answering steps, outputs of the question-answering steps, processes of the question-answering steps, the knowledge points tested in the question-answering steps, and the questioning styles corresponding to the question-answering steps into input attributes, output attributes, process attributes, knowledge point attributes, and questioning style attributes of the nodes respectively.

Further, the parsing module 41 may be further configured to: parse difficulty levels of the question-answering steps into difficulty attributes of the nodes.

In an alternative embodiment, as shown in FIG. 5, the device further includes: a clustering module 44.

The clustering module 44 is configured to cluster the nodes according to the knowledge points tested in the question-answering steps indicated by the nodes, so as to determine knowledge point categories to which the nodes belong after the knowledge graph for questions is generated.

The nodes in the knowledge graph for questions are clustered by the clustering module 44, so that the nodes can be conveniently managed; and since the nodes are managed by category, nodes can be rapidly located in the process of generating questions, thereby improving the efficiency of question generation.

The information processing device provided in this embodiment parses question-answering steps of existing questions into nodes, wherein the nodes indicating the question-answering steps, knowledge points tested in the question-answering steps, and questioning styles corresponding to the question-answering steps; and then a knowledge graph for questions is formed according to the connection relationships between the nodes, which prepares the conditions for subsequent generation of questions based on the knowledge graph for questions.

Figure 6:
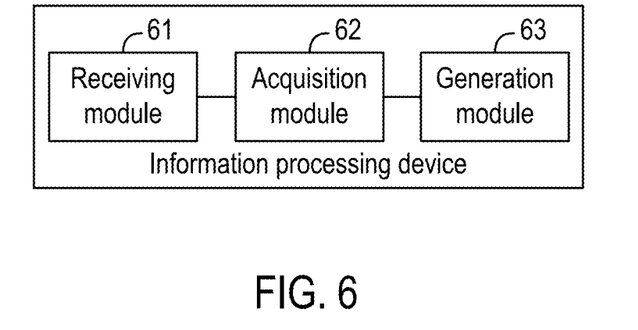
FIG. 6 is a block diagram of an information processing device according to some embodiments of the disclosure.

FIG. 6 is a block diagram of an information processing device according to some embodiments of the disclosure. As shown in FIG. 6, the device includes: a receiving module 61, an acquisition module 62, and a generation module 63.

The receiving module 61 is configured to receive a request for generating questions inputted by a user, wherein the request for generating questions comprises a to-be-learned knowledge point.

The acquisition module 62 is configured to acquire, from a knowledge graph for questions, a node path comprising a target node indicating the to-be-learned knowledge point received by the receiving module 61, nodes in the knowledge graph for questions indicating question-answering steps of existing questions, knowledge points tested in the question-answering steps, and questioning styles corresponding to the question-answering steps.

The generation module 63 is configured to generate questions required by the user according to the following that the acquisition module 62 acquires: question-answering steps, knowledge points tested in the question-answering steps, and questioning styles corresponding to the question-answering steps indicated by nodes on the node path.

In an alternative embodiment, the acquisition module 62 may be configured to: determine a location of the target node in the knowledge graph for questions according to the to-be-learned knowledge point; determine a starting node and an ending node according to the location of the target node in the knowledge graph for questions and a specified path length range; and acquire the node path passing through the target node from the starting node to the ending node.

For example, in determining a starting node and an ending node according to the location of the target node in the knowledge graph for questions and a specified path length range, the acquisition module 62 may be configured to: select a to-be-used path length from the specified path length range; determine the target node in the knowledge graph for questions according to the location of the target node in the knowledge graph for questions; acquire a node connected to the target node and having a path length to the target node smaller than the to-be-used path length as the starting node according to the connection relationships of the target node; and acquire a node connected to the starting node through the target node and having a path length to the starting node equal to the to-be-used path length as the ending node according to the connection relationships of the starting node.

As another example, in determining a starting node and an ending node according to the location of the target node in the knowledge graph for questions and a specified path length range, the acquisition module 62 may be configured to: use the location of the target node in the knowledge graph for questions and the specified path length range as traversal conditions to directly find a node path passing through the target node and having a path length satisfying the path length range by using various traversal algorithms; and determine one endpoint of the node path as the starting node and one endpoint as the ending node according to an input/output direction of the nodes on the node path.

It should be additionally noted that the path length from the starting node to the target node and the path length from the target node to the ending node are not limited in this embodiment; as long as a sum of the two path lengths satisfies the specified path length range that will suffice. Certainly, two node paths having the same or approximately the same path lengths may also be selected using a certain algorithm. For example, in the aforementioned selection of the starting node, any node connected to the target node and having a path length to the target node equal to half of the to-be-used path length may be selected as the starting node.

Multiple pairs of starting nodes and ending nodes may be determined through the above mechanism; in other words, multiple node paths will be obtained in the end. When multiple node paths passing through the target node and having path lengths satisfying the specified path length range exist, the simplest implementation is to randomly select one or more node paths from them. Such an implementation is relatively simple that helps to improve computational efficiency and reduces computational costs. Certainly, the multiple node paths may also be ranked according to a certain standard; and then one or more optimal node paths are selected therefrom. Or, each node path in the acquired multiple node paths may be used to generate a question for the user directly.

Further, in determining a location of the target node in the knowledge graph for questions according to the to-be-learned knowledge point, the acquisition module 62 may be configured to: acquire, from the exercise knowledge graph, nodes belonging to a knowledge point category to which the knowledge point to be learned belongs; and determine the target node and the location of the target node in the knowledge graph for questions based on the nodes belonging to the knowledge point category.

In an alternative embodiment, the generation module 63 may be configured to: combine the questioning styles corresponding to the question-answering steps indicated by each node on the node path to obtain at least one questioning style combination; and combine the question-answering steps indicated by the nodes on the node path and the knowledge points tested in the question-answering steps according to every questioning style combination in the at least one questioning style combination, so as to generate the questions required by the user.

Optionally, the question-answering steps indicated by the nodes on the node path are fuzzy-processed. Based on this, in the question-answering steps indicated by the nodes on the node path and the knowledge points tested in the question-answering steps according to every questioning style combination in the at least one questioning style combination, so as to generate the questions required by the user, the generation module 63 may be configured to: combine the question-answering steps indicated by the nodes on the node path and the knowledge points tested in the question-answering steps according to every questioning style combination, so as to generate questions to be completed; and concretize question-answering steps in the questions to be completed according to a preset concretization rule, so as to generate the questions required by the user.

In an alternative embodiment, the aforementioned request for generating questions not only includes the to-be-learned knowledge point, but also the question difficulty level. Accordingly, the nodes in the knowledge graph for questions further indicate difficulty levels of the question-answering steps.

Based on the above, the generation module 63 may be configured to: generate exercise candidates according to question-answering steps, knowledge points tested in the question-answering steps, and questioning styles corresponding to the question-answering steps indicated by nodes on the node path; determine difficulty levels of the question candidates according to the difficulty levels of the question-answering steps indicated by the nodes on the node path; and select, from the question candidates, the questions required by the user according to the question difficulty level and the difficulty levels of the question candidates.

In an alternative embodiment, the manner of the nodes in the knowledge graph for questions indicating the question-answering steps, the knowledge points tested in the question-answering steps, and the questioning styles corresponding to the question-answering steps is that: input attributes, output attributes, process attributes, knowledge point attributes, and questioning style attributes of the nodes correspond to inputs of the question-answering steps, outputs of the question-answering steps, processes of the question-answering steps, the knowledge points tested in the question-answering steps, and the questioning styles corresponding to the question-answering steps respectively.

Further, difficulty attributes of the nodes further correspond to difficulty levels of the question-answering steps.

The information processing device provided in this embodiment may be used with the information processing device capable of generating a knowledge graph for questions provided in the aforementioned embodiment; when a request for generating questions inputted by a user is received, a node path including a target node indicating a to-be-learned knowledge point included in the request for generating questions may be acquired from the knowledge graph for questions according to the to-be-learned knowledge point comprised in the request for generating questions; and then questions required by the user are formed according to question-answering steps, knowledge points tested in the question-answering steps, and questioning styles corresponding to the question-answering steps indicated by nodes on the node path. The present disclosure solves the problem of question generation and further facilitates the expansion and enhancing of the collection of a question bank.

Those skilled in the art can understand that for a convenient and concise description, references of the specific working processes of the systems, the device, and the units described above can be made by referring to the corresponding processes in the foregoing method embodiments; they are not repeated herein.

In the several embodiments provided by the present disclosure, it should be understood that the disclosed systems, apparatuses, and methods can be implemented in other ways. For example, the device embodiment described above is merely schematic. For example, the division of the units is merely a logical function division; other division methods in practical implementation may exist, like a plurality of units or components can be combined or can be integrated into another system; or some features can be ignored or are not executed. From another point, the intercoupling, direct coupling, or communication connection displayed or discussed may be electrical, mechanical or other forms through some interfaces, indirect coupling or communication connection of the device or the units.

The units described as separate parts may or may not be physically separated; and the parts shown as units may or may not be physical units, which may be located in one place or may be distributed onto a plurality of network units. The objective of the solution of this embodiment may be implemented by selecting a part of or all the units according to actual requirements.

In addition, various functional units in the embodiments of the present disclosure may be integrated in one processing unit, the units exist physically and separately, or two or more units are integrated in one unit. The integrated unit may be implemented by using hardware, and may also be implemented in a form of hardware plus a software functional unit.

The integrated unit implemented in the form of a software functional unit may be stored in a computer readable storage medium. The software functional unit is stored in a storage medium, and includes several instructions that enable a computer device (which may be a personal computer, a server, a network device or the like) or a processor to execute partial steps of the method in the embodiments of the present disclosure. The foregoing storage medium includes various media capable of storing program code, including a USB flash disk, a mobile hard disk, a Read-Only Memory (ROM), a Random Access Memory (RAM), a magnetic disk, an optical disc, or the like.

It should be finally noted that the above embodiments are merely used for illustrating rather than limiting the technical solutions of the present disclosure. Although the present disclosure is described in detail with reference to the foregoing embodiments, those of ordinary skill in the art should understand that the technical solutions recorded in the foregoing embodiments may still be modified or equivalent replacement may be made on partial technical features therein. These modifications or replacements will not make the essence of the corresponding technical solutions be departed from the spirit and scope of the technical solutions in the embodiments of the present disclosure.

The invention claimed is:

1. A method comprising:
generating, by a server device, a knowledge graph representing question-answering steps extracted from a set of existing questions in a question bank;
receiving, at the server device, a request for generating questions from a client device;
calculating, at the server device, a path within the knowledge graph of questions, the path including a target node representing a knowledge point and a set of nodes representing question-answering steps, knowledge points, and questioning styles;
generating, by the server device, a series of questions based on the set of nodes, the series of questions comprising new questions not stored in the question bank;
storing, by the server device, the series of questions in the question bank; and
transmitting, by the server device, the series of questions to the client device in response to the request for generating questions.

2. The method of claim 1, the receiving a request for generating questions from a client device comprising receiving, by the server device, a to-be-learned knowledge point from the client device and using the to-be-learned knowledge point as the target node.

3. The method of claim 1, the calculating a path within a knowledge graph of questions further comprising:
selecting, by the server device, a starting node and an ending node in the knowledge graph; and
calculating, by the server device, a path passing through the target node from the starting node to the ending node.

4. The method of claim 1, further comprising calculating, by the server device, a set of candidate paths in the knowledge graph, the set of candidate paths including the calculated path.

5. The method of claim 4, further comprising selecting, by the server device, the path from the set of candidate paths by randomly selecting the path.

6. The method of claim 4, further comprising selecting, by the server device, the path from the set of candidate paths by ranking the candidate paths and selecting the path if the path is the highest: ranking path.

7. The method of claim 4, the calculating a set of candidate paths in the knowledge graph comprising calculating, by the server device, a set of candidate paths, each candidate path including a plurality of nodes, each node in the pluralities of nodes having the same questioning style.

8. The method of claim 1, the calculating a path within a knowledge graph of questions comprising calculating, by the server device, a path length for the path based on a difficulty of a knowledge point included within the request for generating questions.

9. A method comprising
retrieving, by a server device, a set of questions from a question bank, each question in the set of questions including at least one question-answering step;
parsing, by the server device, the question-answering steps associated with the set of questions to generate a set of nodes, each node including knowledge points and a questioning style;
marking, by the server device, connection relationships between each node in the set of nodes;
generating, by the server device, a series of questions based on the connection relationships, the series of questions comprising new questions not stored in the question bank; and
storing, by the server device, the series of questions in the question bank.

10. The method of claim 9, the marking connection relationships between each node in the set of nodes comprising establishing, by the server device, connection relationships between question-answering steps of different questions in the set of questions.

11. The method of claim 9, further comprising assigning, by the server device, an input, process, output, questioning style, difficulty level, and knowledge point attribute extracted from the question-answering step to a given node in the set of nodes.

12. The method of claim 9, further comprising merging, by the server device, a plurality of nodes in the set of nodes to form a combined node, the plurality of nodes representing a similar question-answering step.

13. The method of claim 12, the merging further comprising merging, by the server device, the plurality of nodes using a fuzzy rule, the fuzzy rule identifying question-answering steps having shared knowledge points.

14. The method of claim 12, the combined node including multiple questioning style attributes and multiple difficulty levels.

15. A device comprising:
a processor; and
a non-transitory computer-readable storage medium for tangibly storing thereon program logic for execution by the processor, the stored program logic comprising:
logic, executed by the processor, for generating a knowledge graph representing question-answering steps extracted from a set of existing questions in a question bank;
logic, executed by the processor, for receiving a request for generating questions from a client device;
logic, executed by the processor, for calculating a path within the knowledge graph of questions, the path including a target node representing a knowledge point and a set of nodes representing question-answering steps, knowledge points, and questioning styles; and
logic, executed by the processor, for generating a series of questions based on the set of nodes, the series of questions comprising new questions not stored in the question bank;
logic, executed by the processor, for storing the series of questions in the question bank; and
logic, executed by the processor, for transmitting the series of questions to the client device in response to the request for generating questions.

16. The device of claim 15, further comprising logic, executed by the processor, for calculating a set of candidate paths in the knowledge graph, the set of candidate paths including the calculated path.

17. The device of claim 16, the logic for calculating a set of candidate paths in the knowledge graph comprising logic, executed by the processor, for calculating a set of candidate paths, each candidate path including a plurality of nodes, each node in the pluralities of nodes having the same questioning style.

18. The device of claim 15, the logic for calculating a path within a knowledge graph of questions comprising logic, executed by the processor, for calculating a path length for the path based on a difficulty of a knowledge point included within the request for generating questions.

19. The device of claim 15, the logic further comprising
logic, executed by the processor, for retrieving a set of questions from a question bank, each question in the set of questions including at least one question-answering step;
logic, executed by the processor, for parsing the question-answering steps associated with the set of questions to generate a set of nodes, each node including knowledge points and a questioning style; and
logic, executed by the processor, for marking connection relationships between each node in the set of nodes.

20. The device of claim 19, the logic further comprising logic, executed by the processor, for merging a plurality of nodes in the set of nodes to form a combined node, the plurality of nodes representing a similar question-answering step.

* * * * *